(12) United States Patent
Liao et al.

(10) Patent No.: US 8,797,054 B2
(45) Date of Patent: Aug. 5, 2014

(54) THERMAL AND STRESS GRADIENT BASED RC EXTRACTION, TIMING AND POWER ANALYSIS

(75) Inventors: Hongmei Liao, San Diego, CA (US); Riko Radojcic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 13/196,947

(22) Filed: Aug. 3, 2011

(65) Prior Publication Data
US 2013/0033277 A1 Feb. 7, 2013

(51) Int. Cl.
*G01R 31/00* (2006.01)

(52) U.S. Cl.
USPC ...... 324/750.03; 716/106; 716/108; 716/109; 716/110; 716/111; 716/113; 716/136

(58) Field of Classification Search
None
See application file for complete search history.

(56) References Cited

U.S. PATENT DOCUMENTS

2010/0148371 A1* 6/2010 Kaskoun et al. ............. 257/777

OTHER PUBLICATIONS

Puttaswamy '006 (Puttaswamy et al., "Thermal Analysis of a 3D Die-Stacked High-Performance Microprocessor", 2006, Great Lakes Symposium on VLSI, ACM, pp. 19-24).*
International Search Report and Written Opinion—PCT/US2012/049660—ISA/EPO—Oct. 29, 2012.
Pedram, M., et al., "Thermal Modeling, Analysis, and Management in VLSI Circuits: Principles and Methods", Proceedings of the IEEE, IEEE. New York, US, vol. 94, No. 8, Aug. 1, 2006, pp. 1487-1501, XP011442776, ISSN: 0018-9219, DOI: 10.1109/JPROC.2006.879797 ISBN: 1-4244-5213-9 the whole document.
Yang J.S., et al., "TSV stress aware timing analysis with applications to 3D-IC layout optimization", Design Automation Conference (DAC), 2010 47th ACM/IEEE, IEEE, Piscataway, NJ, USA, Jun. 13, 2010, pp. 803-806, XP031716402, ISBN: 978-1-4244-6677-1.

* cited by examiner

*Primary Examiner* — Melissa Koval
*Assistant Examiner* — Stephen G Armstrong
(74) *Attorney, Agent, or Firm* — Sam Talpalatsky; Nicholas J. Pauley; Joseph Agusta

(57) ABSTRACT

Timing, power and SPICE analysis are performed on a circuit layout, based on temperature and stress variations or gradient across the circuit layout. Specifically, the temperature and stress values of individual window locations across the layout are used to obtain temperature and stress variation aware resistance/capacitance (RC), timing, leakage and power values. In addition, in 3D integrated circuits (IC), the stress and thermal variations or gradients of one die may be imported to another die located on a different tier.

26 Claims, 5 Drawing Sheets

THERMAL AND STRESS GRADIENT BASED RC EXTRACTION, TIMING AND POWER ANALYSIS

BACKGROUND

1. Field

Aspects of the present disclosure relate generally to the field of electronic devices, and more particularly, to circuit analysis techniques.

2. Background

As technology scaling progresses, the costs are increasing. Three dimensional (3D) technology based on through vias can significantly improve circuit performance and density. However, heat dissipation is a major challenge. Because of stacking and/or circuit density, there is a large temperature variation across the chip which may produce extensive localized heating. Device electrical parameters, such as resistance, capacitance, carrier mobility, threshold voltage, electromigration, and sub-threshold leakage current, are all functions of temperature. Thus, a need exists for identifying and quantifying the temperature variation. Similarly, because carrier mobility is a function of stress, a need also exists for identifying and quantifying the stress variation.

Conventionally, temperature variation and stress variation across the chip area are not considered during the circuit design process. For example, timing and power analysis are performed without considering the impact of stress. As for temperature, timing and power analysis occurs at pre-defined corners of the chip where the temperature is selected as either a maximum value or a minimum value. That selected value is assumed for all circuits on the chip. As such, the circuits at the regions of thermal or stress hot spots are not properly characterized during design, possibly leading to circuit failure upon manufacture.

SUMMARY

According to one aspect, a range of temperature and stress values of each of many windows located across the circuit is analyzed. Based on these temperature and stress values, the resistance capacitance (RC) parasitic values of individual windows are calculated.

In another aspect, an apparatus includes means for analyzing a range of temperature values and a range of stress values for each of a plurality of window locations across a circuit layout. The apparatus also includes means for calculating window location specific resistance capacitance (RC) parasitic values based on the analyzed temperature and stress values of each corresponding window location.

In yet another aspect, a computer readable medium records program code. The program code includes program code to analyze a range of temperature and stress values of each of many windows locations across the circuit. The program code also includes program code to calculate the resistance capacitance (RC) parasitic values of individual windows, based on the analyzed temperature and stress values.

In still another aspect, a method includes the step of analyzing a range of temperature values and a range of stress values for each of a plurality of window locations across a circuit layout. The method also includes the step of calculating window location specific resistance capacitance (RC) parasitic values based on the analyzed temperature and stress values of each corresponding window location.

In a further aspect, an apparatus for circuit layout analysis includes a memory and at least one processor coupled to the memory. The processor(s) is configured to analyze a range of temperature values and a range of stress values for each of a group of window locations across a circuit layout. The processor(s) is also configured to calculate window location specific resistance capacitance (RC) parasitic values based on the analyzed temperature and stress values of a corresponding window location.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

According to an aspect of the present disclosure, temperature and stress variations across a chip are accounted for when analyzing the chip. Accordingly, resistance and capacitance are more accurately modeled, leading to more precise timing and power analyses of circuits on the chip.

Figure 1A:
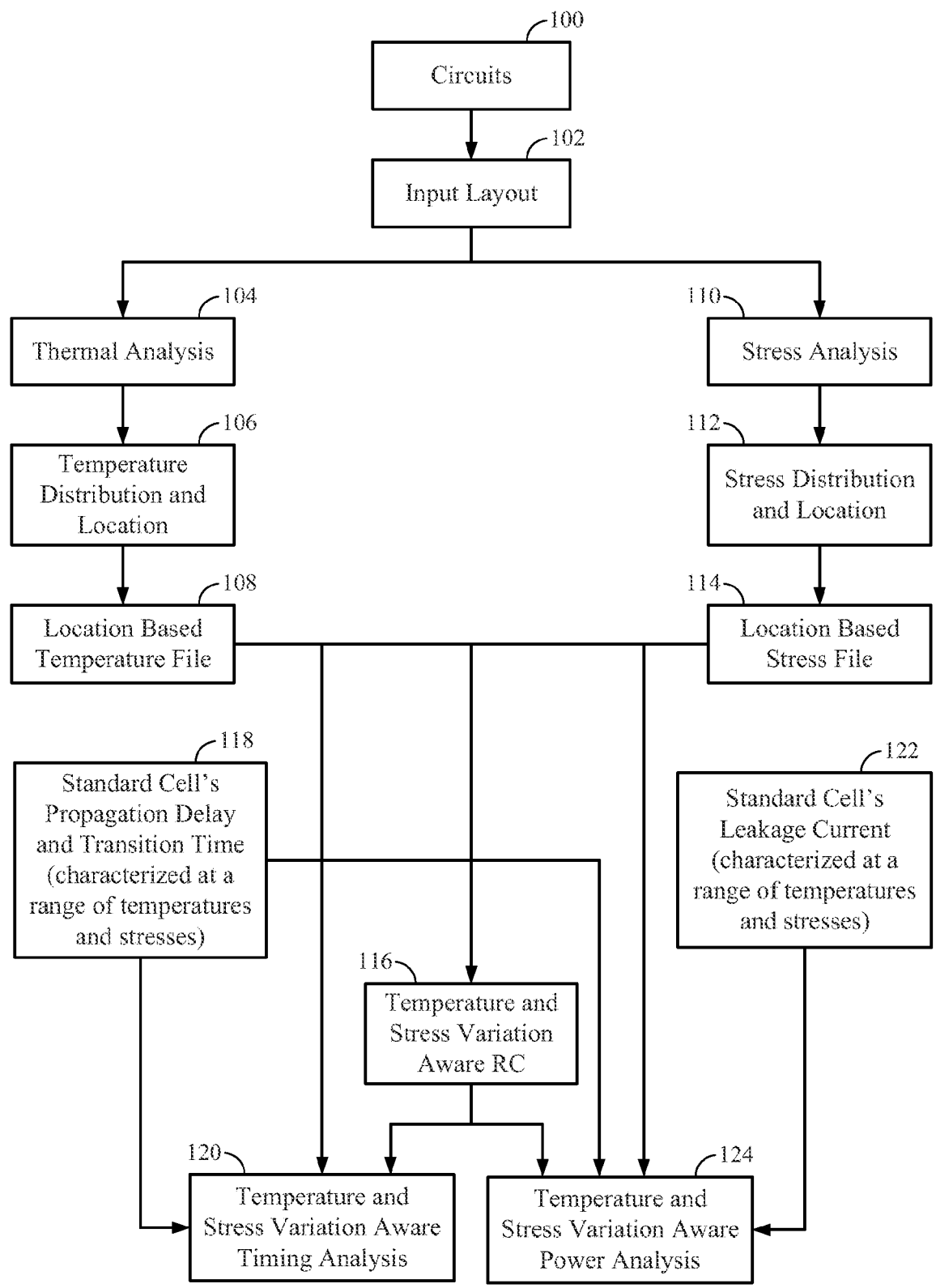
FIG. 1A is a flow diagram conceptually illustrating the present disclosure.

An exemplary operation of the present disclosure is illustrated in FIG. 1A. At block 100, a chip containing the circuits to be analyzed is identified. Input of the layout of the circuits on the whole chip occurs at block 102. In one embodiment, the input layout is in the form of a GDSII file.

At block 104, thermal analysis is performed. In one embodiment, the analysis may use a finite element solver or compact model. From the thermal analysis, peak temperature values and each corresponding location is obtained at block 106. A location based temperature file is then generated, at block 108, from the results of the thermal analysis by obtaining the average of peak temperatures within each individual window location on the layout.

Figure 2:
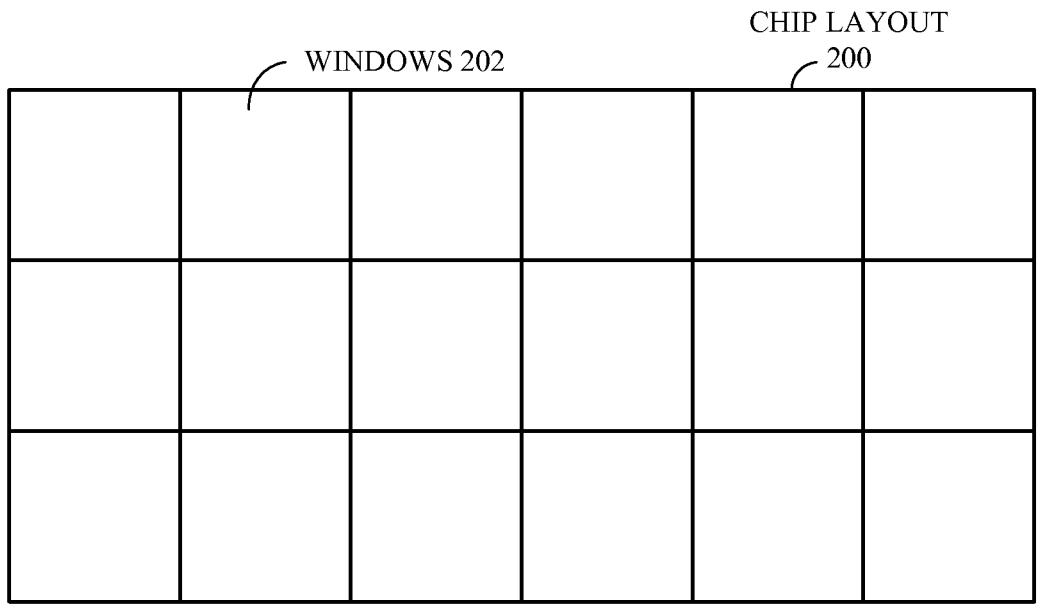
FIG. 2 is a block diagram illustrating exemplary window locations on a circuit layout according to the present disclosure.

As seen in FIG. 2, the windows 202 are regions of the chip layout 200 and may be of any size desired or selected by the user (e.g., 5 micron by 5 micron). That is, the entire chip layout 200 is divided into windows 202 so that analyses can occur at each window, rather than being based on general conditions of the entire chip.

Returning to FIG. 1A, at block 110, a stress analysis is performed on the circuit layout. Based on the analysis peak stress values are obtained, as well as corresponding locations at block 112. At block 114, a location based stress file is generated by obtaining the average of peak stress values within each individual window location on the layout.

The location based temperature and stress files can be used to obtain more accurate characterization of circuits in the chip layout. For example, at block 116 resistance capacitance (RC) parasitic extraction at each of the individual window locations is performed. The resistance and capacitance are calculated using data from the location based temperature and stress files, and either a well defined equation or a calibrated look up table. As such, the temperature and stress variation aware RC extraction is obtained.

For static timing analysis, standard cells are characterized at a range of temperatures and stresses. At block 118, propagation delays and transition times for standard cells are characterized and represented in a look up table using temperature and stress as variables (e.g., .LIB files). At block 120, the temperature and stress variation aware timing of the circuit layout (i.e., set up and hold times) is derived based on the temperature and stress variation aware RC extraction, temperature and stress dependent propagation delay and transition time, and the location based temperature and stress files. When the timing of the circuit layout is calculated, the temperature and stress variation aware parasitic RC values are used. With the location based temperature and stress files, the corresponding values of the propagation delays and transition times are obtained for each standard cell at a specific location within the layout.

The location based temperature and stress files can also improve power analysis because sub-threshold leakage current is a function of carrier mobility and threshold voltage. For example, at block 122, leakage current for standard cells and/or gates is characterized at a range of temperatures and stresses, resulting in temperature and stress variation aware leakage current (e.g., .LIB files). At block 124, the temperature and stress variation aware power consumption of the circuit layout is derived based on the temperature and stress variation aware RC extraction, and leakage current (122), the propagation delay and transition time (118), the location based temperature file (108) and the location based stress file (114).

Based on the temperature and stress variation aware timing and power analyses, the overall circuit layout can be evaluated. For example, the analyses could be compared to desired timing and power performance for that circuit layout. If it passes, then further development of the chip could occur. On the other hand, if it fails, then the circuit will need to be modified and the process could be repeated on the new circuit design.

Figure 1B:
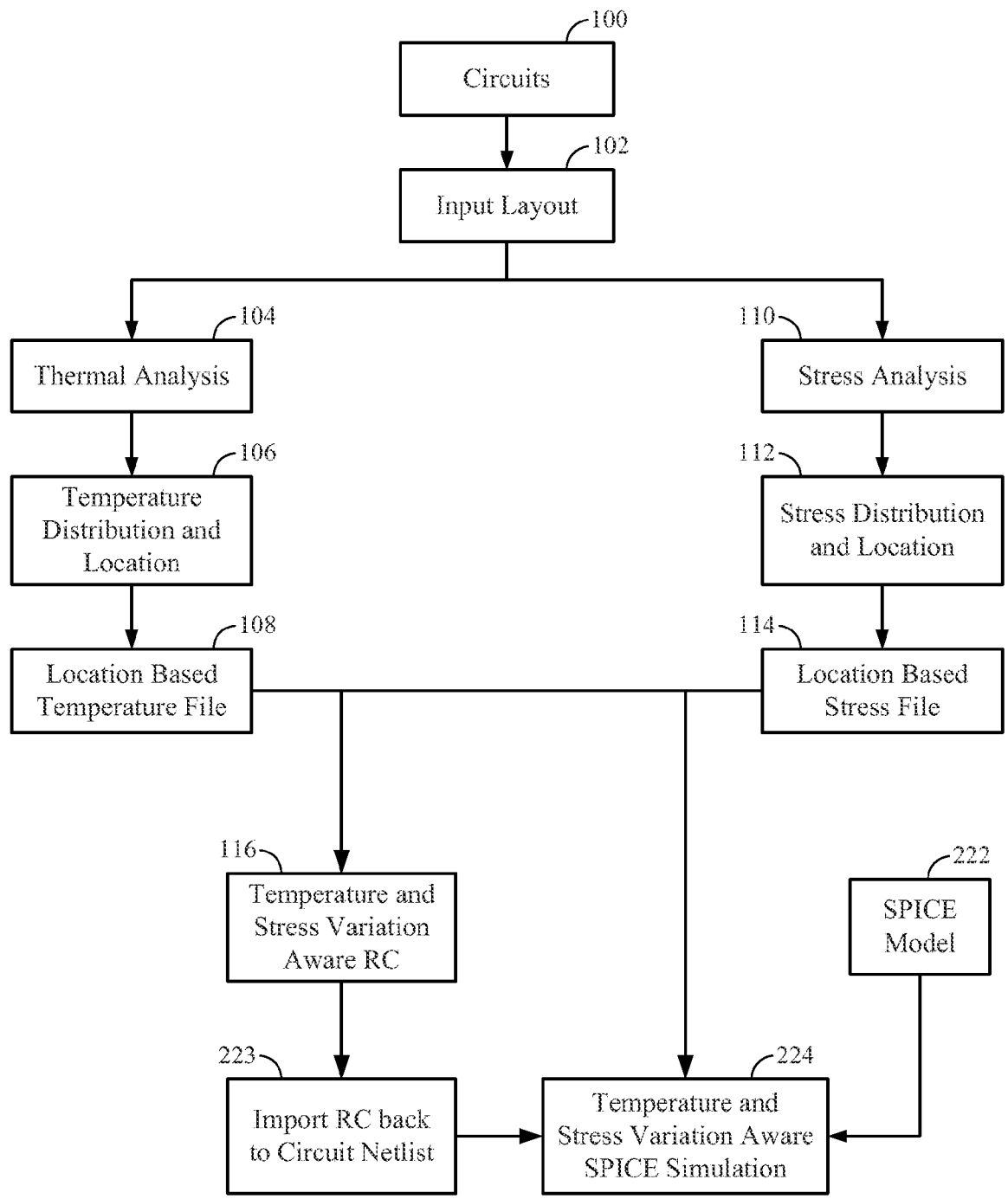
FIG. 1B is a flow diagram conceptually illustrating the present disclosure.

Another exemplary operation of the present disclosure is illustrated in FIG. 1B in which simulation program with integrated circuit emphasis (SPICE) simulation occurs. After the temperature and stress variation aware RC extractions are obtained at block 116, they are imported back to a circuit netlist (223). The circuit netlist and a SPICE model (222), and the location based temperature file (108), and the location based stress file (104) then applied to a temperature and stress variation aware SPICE simulation (224) to analyze the circuit layout.

Figure 3:
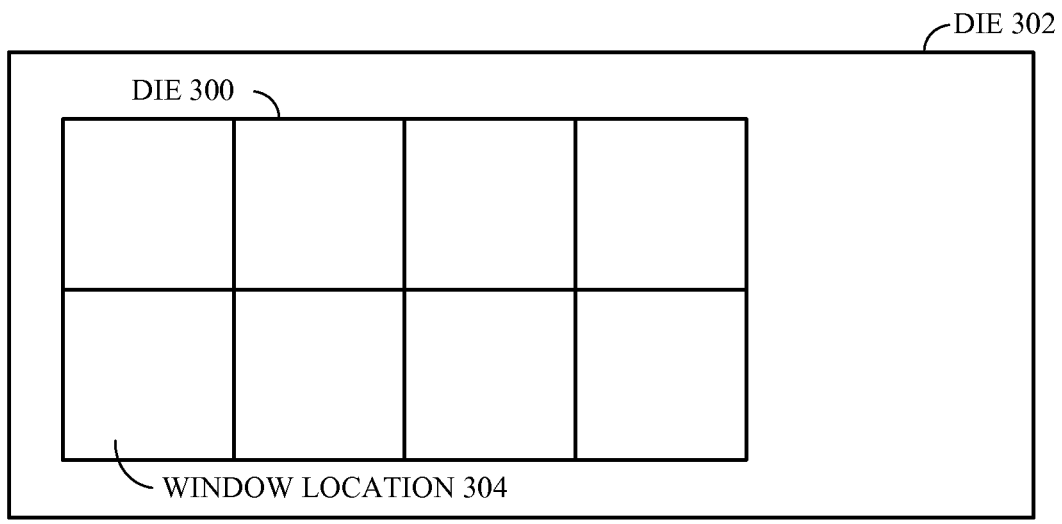
FIG. 3 is a block diagram illustrating a top view of an exemplary stacked die according to one aspect of the present disclosure.

According to one embodiment of the present disclosure, for 3D integrated circuits (ICs) (i.e., stacked tiers, in which at least one of the tiers includes through vias), the location and stress based temperature profiles of a circuit layout of a first die/tier can be imported to another die/tier within the same stack. FIG. 3 illustrates a top view of a 3D IC in which a die 300 of tier 2 is stacked on top of a die 302 on tier 1. Within the area where the circuit layouts of die 300 and die 302 overlap with each other, there is no method of creating location based temperature and stress files while considering two separate layouts from two dies. After creating location based temperature and stress profiles for the circuit layout of the die 300 of tier 2, the temperature and stress values of each individual window location 304 in the overlap area of the die 302 in tier 2 may be used for the corresponding individual location window in the same overlap area on the layout of other tier (tier 1).

Thus, it can be seen that thermal and stress gradient profiles of a chip layout can be used to improve timing and power analyses of that layout.

Figure 4:
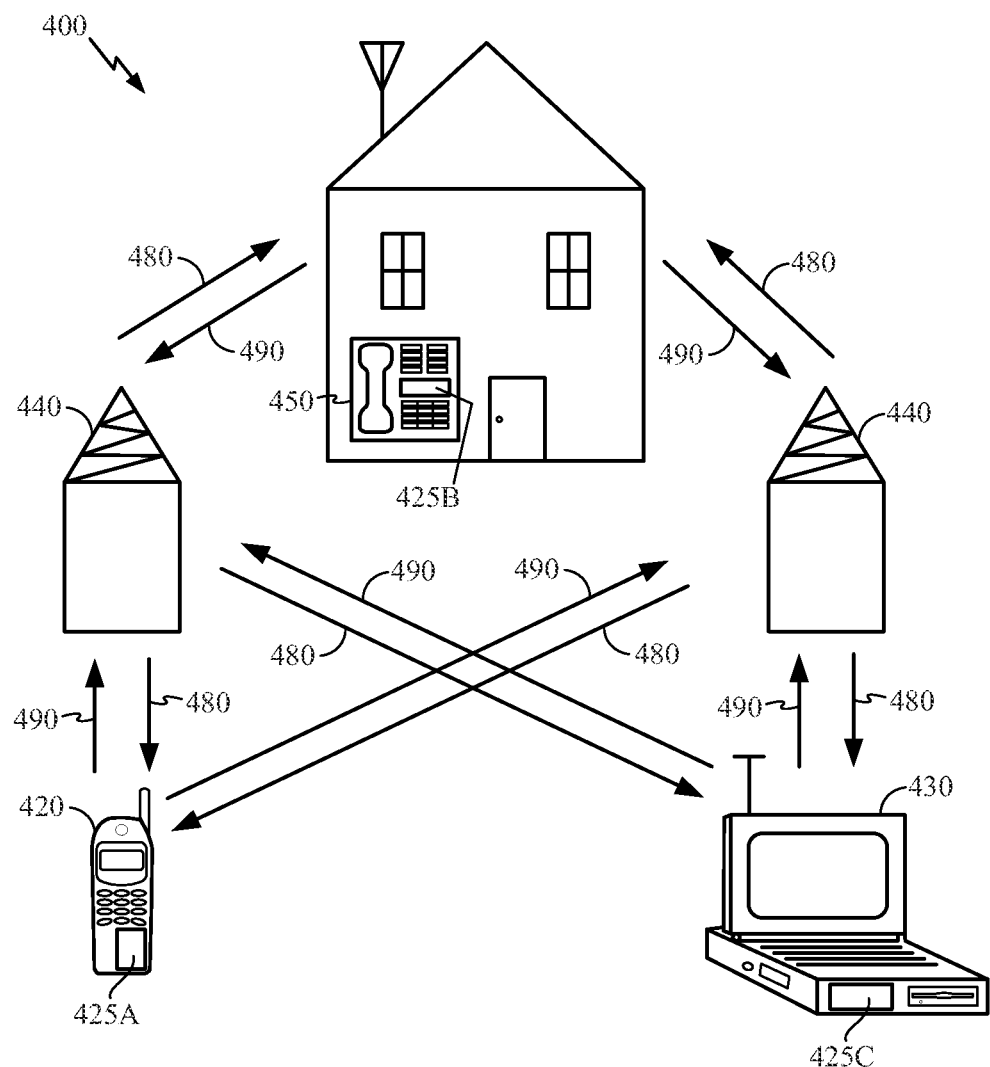
FIG. 4 is a block diagram showing an exemplary wireless communication system in which an embodiment of the disclosure may be advantageously employed.

FIG. 4 is a block diagram showing an exemplary wireless communication system 400 in which an embodiment of the disclosure may be advantageously employed. For purposes of illustration, FIG. 4 shows three remote units 420, 430, and 450 and two base stations 440. It will be recognized that wireless communication systems may have many more remote units and base stations. Remote units 420, 430, and 450 include IC devices 425A, 425C and 425B, designed using the timing and power analyses based on thermal and stress gradient. It will be recognized that any device containing an IC may also be designed using the timing and power analysis based on thermal and stress gradient disclosed here, including the base stations, switching devices, and network equipment. FIG. 4 shows forward link signals 480 from the base station 440 to the remote units 420, 430, and 450 and reverse link signals 490 from the remote units 420, 430, and 450 to base stations 440.

In FIG. 4, remote unit 420 is shown as a mobile telephone, remote unit 430 is shown as a portable computer, and remote unit 450 is shown as a fixed location remote unit in a wireless local loop system. For example, the remote units may be mobile phones, hand-held personal communication systems (PCS) units, portable data units such as personal data assistants, GPS enabled devices, navigation devices, set top boxes, music players, video players, entertainment units, fixed location data units such as meter reading equipment, or any other device that stores or retrieves data or computer instructions, or any combination thereof. Although FIG. 4 illustrates remote units according to the teachings of the disclosure, the disclosure is not limited to these exemplary illustrated units. Embodiments of the disclosure may be suitably employed for any device designed with thermal and stress gradient based analyses.

Figure 5:
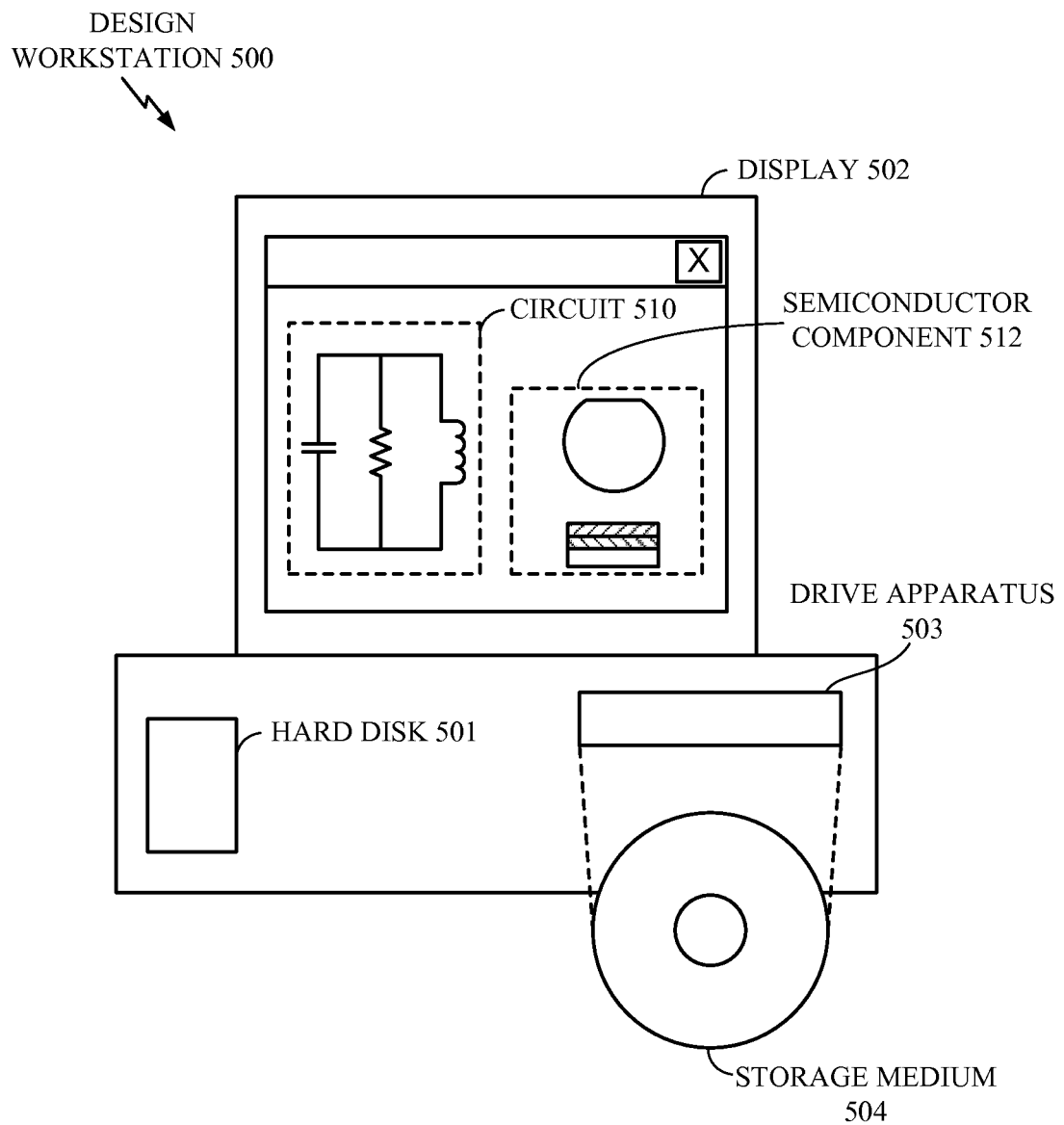
FIG. 5 is a block diagram illustrating a design workstation used for circuit, layout, and logic design of a semiconductor component according to one embodiment.

FIG. 5 is a block diagram illustrating a design workstation used for circuit, layout, and logic design of a semiconductor component, employing thermal and stress gradient based timing and power analyses as disclosed above. A design workstation 500 includes a hard disk 501 containing operating system software, support files, and design software such as Cadence or OrCAD. The design workstation 500 also includes a display to facilitate design of a circuit 510 or a semiconductor component 512 such as a circuit layout wherein timing and power analysis are performed based on the thermal and stress gradient. A storage medium 504 is provided for tangibly storing the circuit design 510 or the semiconductor component 512. The circuit design 510 or the semiconductor component 512 may be stored on the storage medium 504 in a file format such as GDSII or GERBER. The storage medium 504 may be a CD-ROM, DVD, hard disk, flash memory, or other appropriate device. Furthermore, the design workstation 500 includes a drive apparatus 503 for accepting input from or writing output to the storage medium 504.

Data recorded on the storage medium 504 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 504 facilitates the design of the circuit design 510 or the semiconductor component 512 by decreasing the number of processes for designing semiconductor wafers.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, malefic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (MD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although specific circuitry has been set forth, it will be appreciated by those skilled in the art that not all of the disclosed circuitry is required to practice the disclosure. Moreover, certain well known circuits have not been described, to maintain focus on the disclosure.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of circuit layout analysis, comprising:
analyzing a range of temperature values and a range of stress values for each of a plurality of regions across a circuit layout; and
calculating region specific resistance capacitance (RC) parasitic values for each region in the plurality of regions across the circuit layout based on the analyzed temperature and stress values of a corresponding region in the plurality of regions across the circuit layout.

2. The method of claim 1, further comprising calculating timing values for the circuit layout based on the calculated RC values, standard cell propagation delay values and transition time values, and analyzed temperature and stress values of at least one region in the plurality of regions across the circuit layout.

3. The method of claim 1, further comprising calculating power values of the circuit layout based on the calculated RC values, standard cell leakage current values, and analyzed temperature and stress values of at least one region in the plurality of regions across the circuit layout.

4. The method of claim 1, further comprising importing the analyzed temperature values of individual regions in the plurality of regions of the circuit layout of one die to corresponding regions of another die on a different tier of a 3D integrated circuit (IC).

5. The method of claim 1, further comprising simulating the circuit layout with simulation program with integrated circuit emphasis (SPICE), in accordance with the calculated RC values.

6. The method of claim 1, further comprising integrating the circuit layout into at least one of a mobile phone, a set top box, a music player, a video player, an entertainment unit, a navigation device, a computer, a hand-held personal communication systems (PCS) unit, a portable data unit, and a fixed location data unit.

7. An apparatus for circuit layout analysis, comprising:
means for analyzing a range of temperature values and a range of stress values for each of a plurality of regions across a circuit layout; and
means for calculating region specific resistance capacitance (RC) parasitic values for each region in the plurality of regions across the circuit layout based on the analyzed temperature and stress values of a corresponding region in the plurality of regions across the circuit layout.

8. The apparatus of claim 7, further comprising means for calculating timing values for the circuit layout based on calculated RC values, standard cell propagation delay values and transition time values, and analyzed temperature and stress values of at least one region in the plurality of regions across the circuit layout.

9. The apparatus of claim 7, further comprising means for calculating power values of the circuit layout based on calculated RC values, standard cell leakage current values, and analyzed temperature and stress values of at least one region in the plurality of regions across the circuit layout.

10. The apparatus of claim 7, further comprising means for importing the analyzed temperature values of individual regions in the plurality of regions of the circuit layout of one die to corresponding regions of another die on a different tier of a 3D integrated circuit (IC).

11. The apparatus of claim 7, further comprising means for simulating the circuit layout with simulation program with integrated circuit emphasis (SPICE), in accordance with calculated RC values.

12. The apparatus of claim 7, further comprising means for integrating the circuit layout into at least one of a mobile phone, a set top box, a music player, a video player, an entertainment unit, a navigation device, a computer, a hand-held personal communication systems (PCS) unit, a portable data unit, and a fixed location data unit.

13. A computer readable medium storing non-transitory program code for circuit layout analysis, comprising:
    program code to analyze a range of temperature values and a range of stress values for each of a plurality of regions across a circuit layout; and
    program code to calculate region specific resistance capacitance (RC) parasitic values for each region in the plurality of regions across the circuit layout based on the analyzed temperature and stress values of a corresponding region in the plurality of regions across the circuit layout.

14. The medium of claim 13, further comprising program code to calculate timing values for the circuit layout based on the calculated RC values, standard cell propagation delay values and transition time values, and analyzed temperature and stress values of at least one region in the plurality of regions across the circuit layout.

15. The medium of claim 13, further comprising program code to calculate power values of the circuit layout based on the calculated RC values, standard cell leakage current values, and analyzed temperature and stress values of at least one region in the plurality of regions across the circuit layout.

16. The medium of claim 13, further comprising program code to import the analyzed temperature values of individual regions in the plurality of regions of the circuit layout of one die to corresponding regions of another die on a different tier of a 3D integrated circuit (IC).

17. The medium of claim 13, further comprising program code to simulate the circuit layout with simulation program with integrated circuit emphasis (SPICE), in accordance with the calculated RC values.

18. The medium of claim 13, further comprising program code to integrate the circuit layout into at least one of a mobile phone, a set top box, a music player, a video player, an entertainment unit, a navigation device, a computer, a hand-held personal communication systems (PCS) unit, a portable data unit, and a fixed location data unit.

19. A method of circuit layout analysis, comprising:
    the step for analyzing a range of temperature values and a range of stress values for each of a plurality of regions across a circuit layout; and
    the step for calculating window location specific resistance capacitance (RC) parasitic values for each region in the plurality of regions across the circuit layout based on the analyzed temperature and stress values of a corresponding region in the plurality of regions across the circuit layout.

20. The method of claim 19, further comprising the step of integrating the circuit layout into at least one of a mobile phone, a set top box, a music player, a video player, an entertainment unit, a navigation device, a computer, a hand-held personal communication systems (PCS) unit, a portable data unit, and a fixed location data unit.

21. An apparatus for circuit layout analysis, comprising:
    a memory; and
    at least one processor coupled to the memory and configured:
    to analyze a range of temperature values and a range of stress values for each of a plurality of regions across a circuit layout; and
    to calculate region specific resistance capacitance (RC) parasitic values for each region in the plurality of regions across the circuit layout based on the analyzed temperature and stress values of a corresponding region in the plurality of regions across the circuit layout.

22. The apparatus of claim 21, in which the processor is further configured to calculate timing values for the circuit layout based on the calculated RC values, standard cell propagation delay values and transition time values, and analyzed temperature and stress values of at least one region in the plurality of regions across the circuit layout.

23. The apparatus of claim 21, in which the processor is further configured to calculate power values of the circuit layout based on the calculated RC values, standard cell leakage current values, and analyzed temperature and stress values of at least one region in the plurality of regions across the circuit layout.

24. The apparatus of claim 21, in which the processor is further configured to import the analyzed temperature values of individual regions in the plurality of regions of the circuit layout of one die to corresponding regions of another die on a different tier of a 3D integrated circuit (IC).

25. The apparatus of claim 21, in which the processor is further configured to simulate the circuit layout with simulation program with integrated circuit emphasis (SPICE), in accordance with the calculated RC values.

26. The apparatus of claim 21, in which the processor is further configured to integrate the circuit layout into at least one of a mobile phone, a set top box, a music player, a video player, an entertainment unit, a navigation device, a computer, a hand-held personal communication systems (PCS) unit, a portable data unit, and a fixed location data unit.

* * * * *